US008477468B2

(12) United States Patent

Mosesian et al.

(10) Patent No.: US 8,477,468 B2

(45) Date of Patent: Jul. 2, 2013

(54) CIRCUIT PROTECTION DEVICE

(75) Inventors: Jerry L. Mosesian, Newburyport, MA (US); Jean-Francois de Palma, Arlington, MA (US); Mark A. Radzim, Ipswich, MA (US)

(73) Assignee: Mersen USA Newburyport-MA, LLC, Newburyport, MA (US)

( * ) Notice: Subject to any disclaimer, the term of this patent is extended or adjusted under 35 U.S.C. 154(b) by 28 days.

(21) Appl. No.: 13/289,047

(22) Filed: Nov. 4, 2011

(65) Prior Publication Data

US 2013/0114177 A1 May 9, 2013

(51) Int. Cl.
*H02H 1/00* (2006.01)

(52) U.S. Cl.
USPC .......................................... 361/117; 361/120

(58) Field of Classification Search
USPC .......................................... 361/117–120, 127
See application file for complete search history.

(56) References Cited

U.S. PATENT DOCUMENTS

| | | | | |
|---|---|---|---|---|
| 3,930,215 | A | 12/1975 | Senor | 337/407 |
| 3,944,960 | A | 3/1976 | Audette et al. | 337/408 |
| 4,288,833 | A | 9/1981 | Howell | 361/124 |
| 4,309,685 | A | 1/1982 | Candor | 337/408 |
| 4,493,005 | A | 1/1985 | Lange | 361/124 |
| 4,538,201 | A | 8/1985 | Wuyts et al. | 361/124 |
| 4,562,323 | A | 12/1985 | Belbel et al. | 218/117 |
| 4,652,964 | A | 3/1987 | Ziegenbein | 361/54 |
| 4,691,197 | A | 9/1987 | Damiano et al. | 340/638 |
| 4,720,759 | A | 1/1988 | Tabei | 361/105 |
| 4,733,324 | A | 3/1988 | George | 361/118 |
| 4,739,436 | A | 4/1988 | Stefani et al. | 361/56 |
| 4,801,772 | A | 1/1989 | Bratkowski et al. | 200/151 |
| 4,809,124 | A | 2/1989 | Kresge | 361/58 |
| 4,887,183 | A | 12/1989 | Biederstedt et al. | 361/124 |
| 4,901,183 | A | 2/1990 | Lee | 361/56 |
| 5,043,527 | A | 8/1991 | Carpenter, Jr. | 174/2 |
| 5,073,678 | A | 12/1991 | Carpenter, Jr. | 174/2 |
| 5,101,180 | A | 3/1992 | Frey | 333/12 |
| 5,187,463 | A | 2/1993 | Di Troia et al. | 337/165 |
| 5,276,422 | A | 1/1994 | Ikeda et al. | 337/28 |
| 5,311,393 | A | 5/1994 | Bird | 361/104 |
| 5,359,657 | A | 10/1994 | Pelegris | 379/412 |
| 5,367,279 | A | 11/1994 | Sakai | 337/104 |
| 5,379,176 | A | 1/1995 | Bacon et al. | 361/106 |
| 5,379,177 | A | 1/1995 | Bird | 361/118 |
| 5,392,188 | A | 2/1995 | Epstein | 361/118 |
| 5,404,126 | A | 4/1995 | Kasai et al. | 338/21 |
| 5,495,383 | A | 2/1996 | Yoshioka et al. | 361/56 |
| 5,519,564 | A | 5/1996 | Carpenter, Jr. | 361/127 |

(Continued)

FOREIGN PATENT DOCUMENTS

| | | |
|---|---|---|
| DE | 42 41 311 C2 | 6/1994 |
| EP | 0 716 493 B1 | 6/1996 |

(Continued)

OTHER PUBLICATIONS

Harris Semiconductor, "Transient Voltage Suppression Devices," Transient V-I Characteristics Curves, p. 457, 1995.

(Continued)

*Primary Examiner* — Danny Nguyen
(74) *Attorney, Agent, or Firm* — Kusner & Jaffe

(57) ABSTRACT

A voltage suppression device for suppressing voltage surges in an electrical circuit having a voltage sensitive element within a tubular casing.

25 Claims, 7 Drawing Sheets

U.S. PATENT DOCUMENTS

| | | | | |
|---|---|---|---|---|
| 5,532,897 | A | 7/1996 | Carpenter, Jr. | 361/118 |
| 5,574,614 | A | 11/1996 | Busse et al. | 361/119 |
| 5,644,283 | A | 7/1997 | Grosse-Wilde et al. | 338/20 |
| 5,675,468 | A | 10/1997 | Chang | 361/119 |
| 5,699,818 | A | 12/1997 | Carpenter, Jr. | 135/16 |
| 5,796,183 | A | 8/1998 | Hourmand | 307/116 |
| 5,808,850 | A | 9/1998 | Carpenter, Jr. | 361/127 |
| 5,901,027 | A | 5/1999 | Ziegler et al. | 361/124 |
| 5,933,310 | A | 8/1999 | Eggendorfer | 361/104 |
| 5,956,223 | A | 9/1999 | Banting | 361/117 |
| 6,040,971 | A | 3/2000 | Martenson et al. | 361/118 |
| 6,055,147 | A | 4/2000 | Jeffries et al. | 361/103 |
| 6,211,770 | B1 | 4/2001 | Coyle | 361/117 |
| 6,430,019 | B1 | 8/2002 | Martenson et al. | 361/124 |
| 6,556,410 | B1 | 4/2003 | Manning et al. | 361/118 |
| 6,678,138 | B2 | 1/2004 | Glaser et al. | 361/103 |
| 6,683,770 | B1 | 1/2004 | Marsh | 361/111 |
| 6,765,777 | B2 | 7/2004 | Cantagrel | 361/103 |
| 6,829,129 | B2 | 12/2004 | Marsh et al. | 361/111 |
| 7,106,572 | B1 * | 9/2006 | Girard | 361/118 |
| 2005/0180080 | A1 | 8/2005 | Harris | 361/111 |
| 2005/0202358 | A1 | 9/2005 | Donnelly | 431/22 |
| 2005/0231872 | A1 | 10/2005 | Schimanski et al. | 361/91.9 |
| 2006/0125595 | A1 | 6/2006 | Lu | 337/186 |
| 2007/0139850 | A1 * | 6/2007 | Kamel et al. | 361/124 |

FOREIGN PATENT DOCUMENTS

| | | | |
|---|---|---|---|
| EP | 1 077 452 | A2 | 2/2001 |
| EP | 1 587 188 | A1 | 10/2005 |
| JP | 03-073501 | | 3/1991 |
| JP | 06-311643 | | 11/1994 |
| JP | 11-133084 | | 5/1999 |
| KR | 960015836 | | 11/1996 |

OTHER PUBLICATIONS

Phoenix Contact, Extract from the online catalog for VAL-CP-3S-350VF, Phoenix Contact GmbH & Co. KG, www.phoenixcontact.com, PDF Version, pp. 1-6, Jun. 23, 2006.

Phoenix Cotact, Extract from the online catalog for VAL-CP-350VF-ST, Phoenix Contact GmbH & Co. KG, www.phoenixcontact.com, PDF Version, pp. 1-6, Jun. 23, 2006.

Int'l Search Report from corresponding Int'l App. No. PCT/US2012/057711, issued on Mar. 21, 2013; 4 pages.

* cited by examiner

CIRCUIT PROTECTION DEVICE

FIELD OF THE INVENTION

The present invention relates generally to circuit protection devices and, more particularly, to a device that suppresses transient current/voltage surges.

BACKGROUND OF THE INVENTION

Many of today's highly sensitive electronic components, such as computer and computer-related equipment that are used in commercial and residential applications contain transient voltage surge suppression (TVSS) devices. These devices protect sensitive and/or expensive electronic circuits and components from damage from over-voltage fault conditions. Such transient voltage surge suppression systems are typically designed for moderate fault conditions expected in normal use. In this respect, such systems are designed to suppress relatively minor fault conditions, but are not designed to protect against major over-voltage conditions. Examples of major over-voltage conditions include those that may occur from losing the system neutral or ground termination, or from repetitive current pulses as from lightning strikes. Such major over-voltage conditions can have catastrophic effects on sensitive electronic circuits and components. To prevent such fault conditions from reaching and damaging electronic circuits, components and equipment, it has been known to utilize larger voltage surge suppression devices. These devices are typically deployed at a building's incoming electrical service power lines, or within a building's power distribution grid to control power surges in the electrical lines to the building, or in the electrical lines to specific floors of the building. Such voltage surge suppression devices typically include a plurality of metal-oxide varistors (MOVs) connected in parallel between a service power line and a ground or neutral line, or between a neutral line and a ground line.

MOVs are non-linear, electronic devices made of ceramic-like materials comprising zinc-oxide grains and a complex amorphous inner granular material. Over a wide range of current, the voltage remains within a narrow band commonly called the varistor voltage. A log-log plot of the instantaneous voltage in volts versus the instantaneous current in amps yields a nearly horizontal line. It is this unique current-voltage characteristic that makes MOVs ideal devices for protection of sensitive electronic circuits against electrical surges, over-voltages, faults or shorts.

When exposed to voltages exceeding their voltage value, MOVs become highly conductive devices that absorb and dissipate the energy related to the over-voltage and simultaneously limit dump current to a neutral line or ground plane. If an over-voltage condition is not discontinued, the MOVs will continue to overheat and can ultimately fail catastrophically, i.e., rupture or explode. Such catastrophic failure may destroy the sensitive electronic equipment and components in the vicinity of the MOVs. The destruction of electrical equipment or components in the electrical distribution system can disrupt power to buildings or floors for prolonged periods of time until such components are replaced or repaired. Moreover, the failure of the MOVs in a surge suppression system may allow the fault condition to reach the sensitive electronic equipment the system was designed to protect.

In U.S. Pat. No. 6,040,971 to Martenson et al., entitled CIRCUIT PROTECTION DEVICE, there is disclosed a voltage suppression device for protecting an array of metal oxide varistors in a surge suppression system. The device was operable to drop offline an entire array of MOVs in the event that a voltage surge reached a level wherein one or more of the MOVs in the array might catastrophically fail. In the disclosed device and system, a trigger MOV was designed to have a lower voltage rating than any of the MOVs in the array. Thus, the entire array would drop offline in the event that a surge condition exceeded the voltage rating of the trigger MOV. In some instances, however, it may be desirable to maintain the array of MOVs active and to drop offline only those MOVs sensing a voltage surge exceeding the voltage rating of that particular MOV.

U.S. Pat. No. 6,256,183 to Mosesian et al. discloses a circuit protection device that drops offline when an MOV within the device senses a voltage surge exceeding the voltage rating of the MOV. Both of the foregoing devices are designed to be connected between a service line and a ground line or neutral line, or between a neutral line and a ground line.

The present invention provides a circuit protection device and a transient voltage surge suppression system incorporated within a tubular casing for use in protecting an electrical system from catastrophic failure due to excessive over-voltage conditions or repetitive fault conditions along such line.

SUMMARY OF THE INVENTION

In accordance with a preferred embodiment of the present invention, there is provided a disposable voltage suppression device for suppressing voltage surges in an electrical circuit. The device is comprised of a tubular casing formed of an electrically insulating material. A first conductive component is attached to a first end of the casing. A second conductive component is attached to a second end of the casing. A voltage sensitive element is disposed within the tubular casing. The voltage sensitive element has a first surface and a second surface and a predetermined voltage rating across the first and second surfaces. The voltage sensitive element increases in temperature as voltage applied across the first and second surfaces exceeds the voltage rating. A first terminal is electrically connected to the first surface of the voltage sensitive element and to the first conductive component. A thermal element is electrically connected to the second surface of the voltage sensitive element. The thermal element is an electrically conductive solid at room temperature and has a predetermined softening temperature. A second terminal is electrically connected to the second conductive component. The second terminal has a contact portion in electrical connection with the second surface of the voltage sensitive element. The voltage sensitive element senses a voltage drop between the first conductive element and the second conductive element. The second terminal is maintained in electrical contact with the voltage sensitive element by the thermal element and is biased away therefrom, wherein the second terminal moves away from electrical contact with the voltage sensitive element and breaks the electrical current path if an over-voltage condition sensed by the voltage sensitive element exceeds the voltage rating of the voltage sensitive element and causes the voltage sensitive element to heat the thermal element beyond its softening point. An arc shield is movable from a first position wherein the arc shield allows contact between the contact portion of the second terminal and the voltage sensitive element to a second position wherein the shield is disposed between the contact portion of the second terminal and the voltage sensitive element when the second terminal moves from electrical contact with the voltage sensitive element.

In accordance with another aspect of the present invention, there is provided a voltage suppression device for suppressing voltage surges in an electrical circuit. The device is comprised of a tubular casing formed of an electrically insulating material. A first conductive component is attached to a first end of the casing. A second conductive component is attached to a second end of the casing. A voltage sensitive element having a predetermined voltage rating is provided. The voltage sensitive element increases in temperature as voltage applied across the voltage sensitive element exceeds the voltage rating. Terminals are provided for electrically connecting the voltage sensitive element between the first conductive component and the second conductive component. A normally closed, thermal switch is comprised of one end of one of the terminals, a surface of the voltage sensitive element and a thermal element. The one end of one of the terminals is maintained in electrical contact with the surface of the voltage sensitive element by the thermal element. The thermal switch is electrically connected in series with the voltage sensitive element between one of the conductive components and the voltage sensitive element. The thermal switch is thermally coupled to the voltage sensitive element wherein one of the terminals moves from a normally closed position wherein the one of the terminals is maintained in electrical contact with the surface of the voltage sensitive element to an open position wherein the one of the terminals moves out of electrical contact with the surface of the voltage sensitive element to form a gap between the one of the terminals and the voltage sensitive element when the temperature of the voltage sensitive element reaches a level causing the thermal element to soften. The one of the terminals includes a contact portion and a second portion that extends away from the contact portion. A non-conductive barrier is operable to move into the gap when the one of the terminals moves to an open position. The barrier prevents line voltage surges from arcing between the one of the terminals and the voltage sensitive element. The second portion of the one of the terminals extends over at least a portion of the non-conductive barrier and bends toward the thermal element so that the contact portion is held by the thermal element until the thermal element begins to soften. The non-conductive barrier is biased toward the thermal element, but is constrained from movement toward the thermal element by contact with the second portion of the one of the terminals at a location that is spaced away from the contact portion, until the thermal element begins to soften.

In accordance with another aspect of the present invention, there is provided a voltage suppression device for suppressing voltage surges in an electrical circuit. The device is comprised of a tubular casing formed of an electrically insulating material. A first conductive component is attached to a first end of the casing. A second conductive component is attached to a second end of the casing. A voltage sensitive element is disposed within the casing. The voltage sensitive element has a first surface and a second surface and a predetermined voltage rating across the first and second surfaces. The voltage sensitive element increases in temperature as voltage applied across the first and second surfaces exceeds the voltage rating. A first terminal is electrically connected to the first surface of the voltage sensitive element and the first conductive component. A thermal element is electrically connected to the second surface of the voltage sensitive element. The thermal element is an electrically conductive solid at room temperature and has a predetermined softening temperature. A second terminal is formed of a spring metal that has one end in electrical connection with the second surface of the voltage sensitive element and another end connected to the second conductive component. The voltage sensitive element senses a voltage drop between the first conductive component and the second conductive component. The second terminal is bent from a normal and relaxed configuration to be maintained in contact with the voltage sensitive element by the thermal element. The second terminal is inherently biased away from the voltage sensitive element toward the normal and relaxed configuration, wherein the second terminal springs away from electrical contact with the voltage sensitive element which softens and breaks the electrical current path if an over-voltage condition sensed by the voltage sensitive element exceeds the voltage rating of the voltage sensitive element and causes the voltage sensitive element to heat the thermal element beyond its softening point. An arc shield is movable from a first position wherein the arc shield allows contact between the second terminal and the voltage sensitive element to a second position wherein the arc shield is disposed between the second terminal and the voltage sensitive element when the second terminal moves from electrical contact with the voltage sensitive element. The second terminal has a contact portion for making electrical contact with the thermal element and a second portion. The second portion extends through the path of the arc shield and blocks the movement of the arc shield until the thermal element reaches its softening point.

It is an advantage of the present invention to provide a circuit protection device to protect sensitive circuit components and systems from current and voltage surges.

It is another advantage of the present invention to provide a circuit protection device as described above to prevent catastrophic failure of a transient voltage surge suppression (TVSS) system within a circuit that may occur from repetitive circuit faults or from a single fault of excessive proportion.

A further advantage of the present invention is to provide a circuit protection device as described above that includes a current suppression device and a voltage suppression device.

Another advantage of the present invention is to provide a circuit protection device as described above for protecting a transient voltage surge suppression system having metal-oxide varistors (MOVs).

A still further advantage of the present invention is to provide a circuit protection device as described above that includes a metal-oxide varistor as a circuit-breaking device.

A still further advantage of the present invention is to provide a circuit protection device as described above that is modular in design and easily replaceable in a circuit line.

These and other advantages will become apparent from the following description of a preferred embodiment of the present invention taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
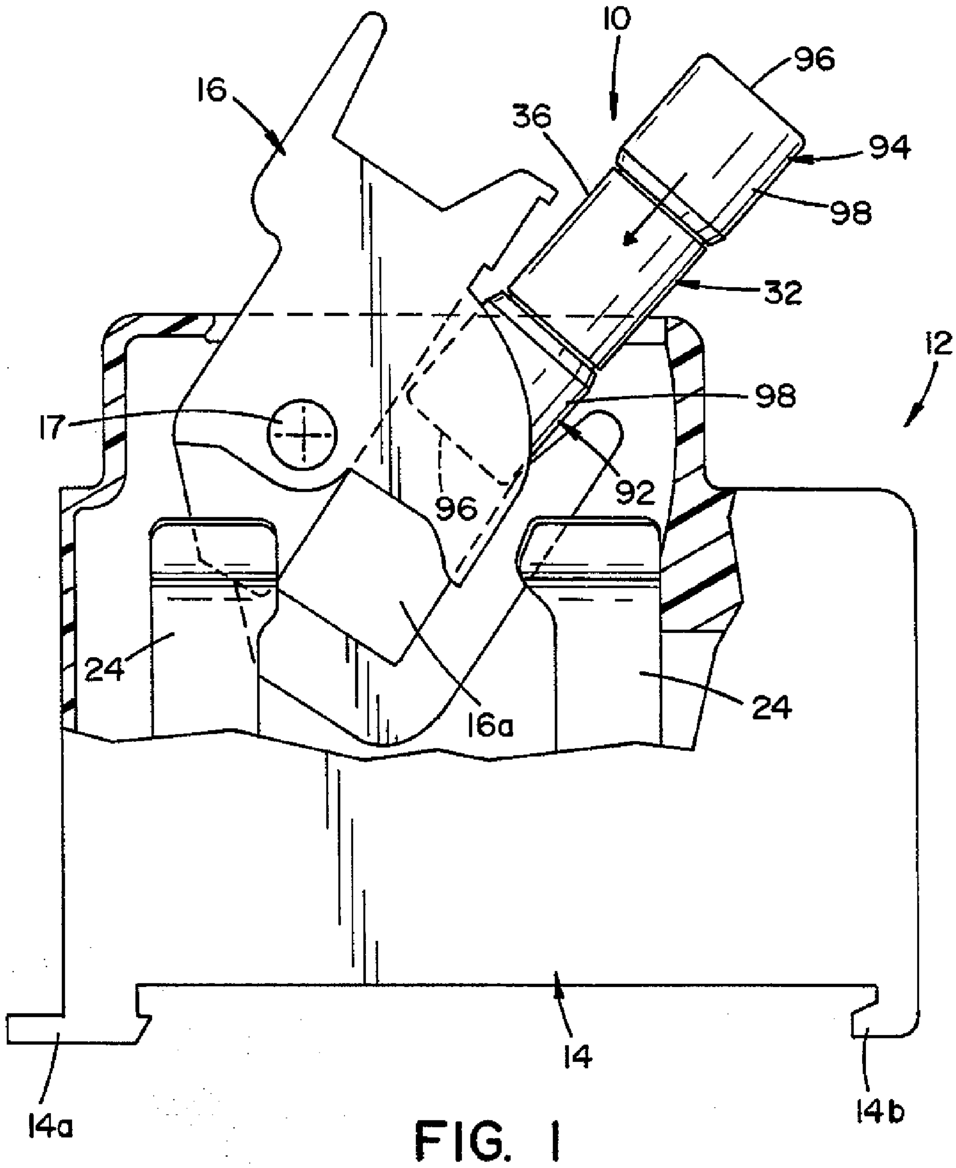
FIG. 1 is a partially-sectioned, side elevation view of a fuse-holder showing a tubular, circuit protection device inserted partially therein.

Referring now to the drawings wherein the showings are for the purpose of illustrating a preferred embodiment of the invention only and not for the purpose of limiting same, FIG. 1 shows a circuit protection device 10, according to a preferred embodiment of the present invention, within a conventional, fuse holder 12. Fuse holder 12, in and of itself, forms no part of the present invention, but shall be described briefly to illustrate a preferred manner of use of a circuit protection device 10.

Fuse holder 12 is comprised of a molded, polymer housing 14 having leg portion 14*a*, 14*b* formed along the lower surface thereof. Leg portion 14*a*, 14*b* are designed to allow housing 14 to be attached, in snap-lock fashion to a mounting rail (not shown), wherein spaced-apart leads (not shown) that form part of an electrical circuit come into electrical contact with spaced-apart pairs of contact blades 24. A receiver 16 is pivotally mounted to housing 14 by a pin 17. Receiver 16 includes an elongated slot 16*a* that is dimensioned to receive a cylindrical fuse (not shown) or a circuit protection device 10 according to the present invention.

Receiver 16 is pivotally movable to housing 14 and is movable between an opened position, as shown in FIG. 1, and a closed position, wherein the ends of a fuse or circuit protection device 10 are in electrical contact with contact blades 24, as will be better understood from a further reading of the present specification.

Figure 2:
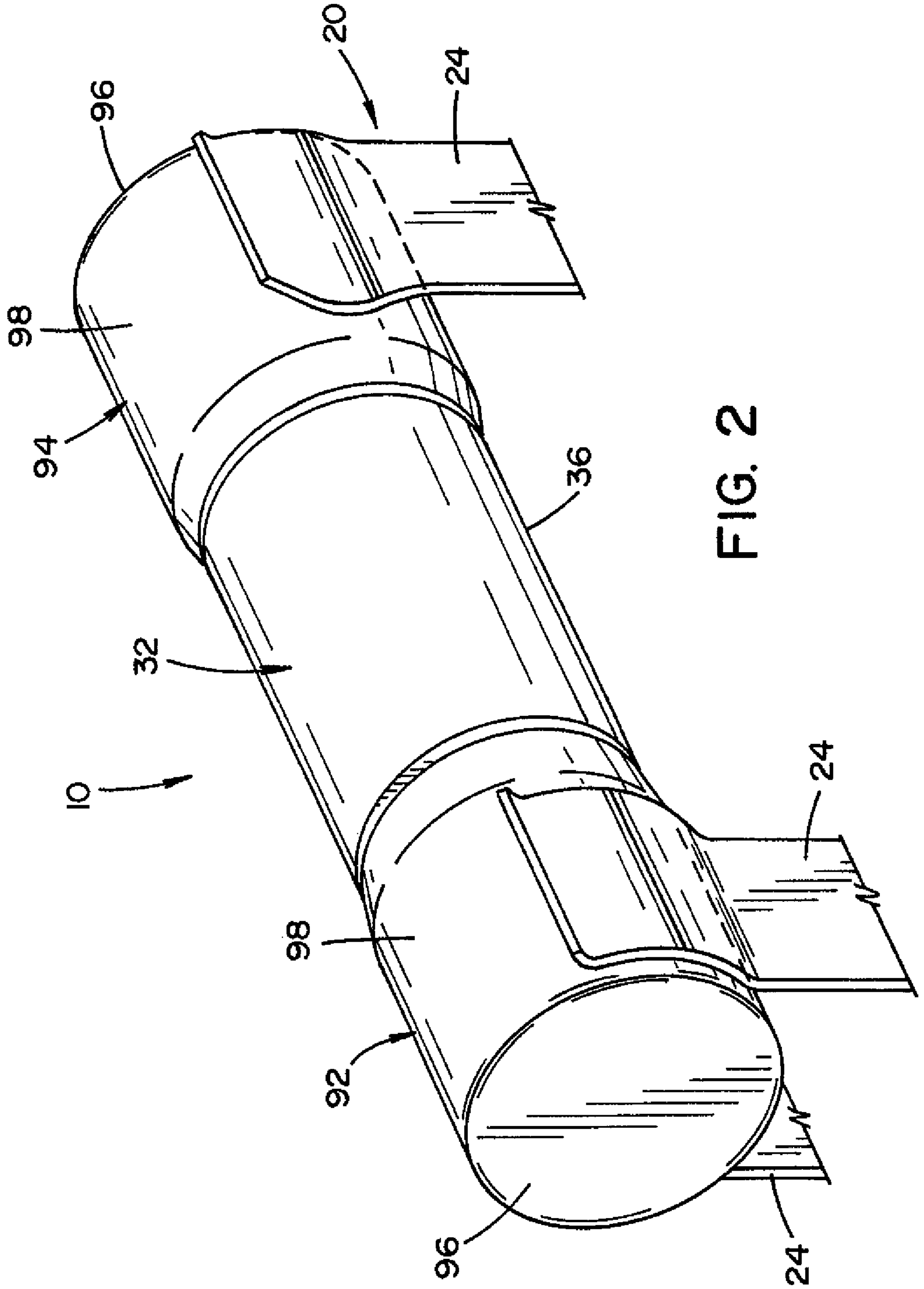
FIG. 2 is a perspective view of a circuit protection device according to a preferred embodiment of the present invention, showing the circuit protection device mounted in a DIN-rail fuse holder.

In FIG. 2, circuit protection device 10 is shown mounted to a conventional DIN-rail fuse mount 20 having a base 22 and spaced-apart pairs of contact blades 24.

Figure 5:
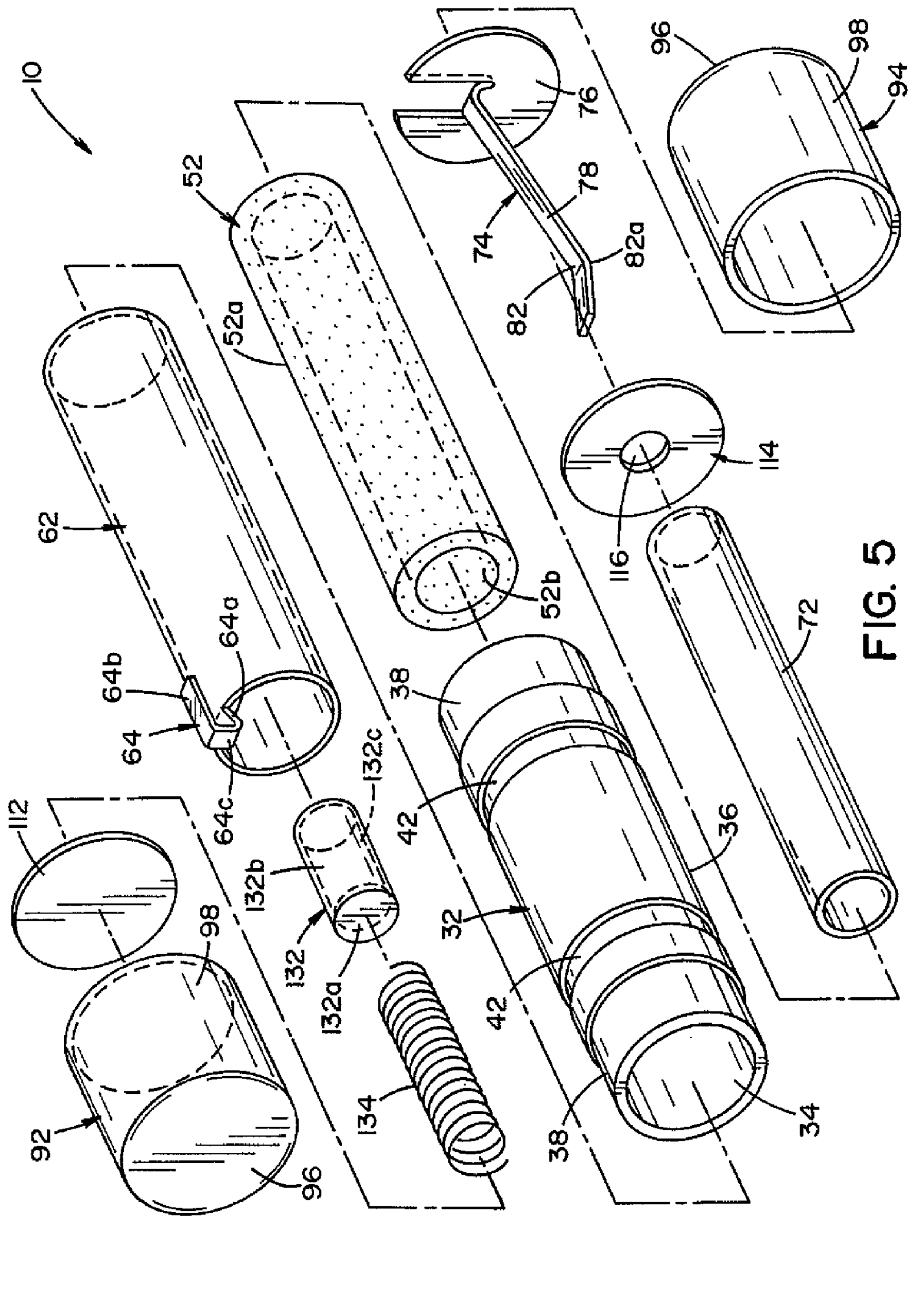
FIG. 5 is an exploded, perspective view of the circuit protection device, shown in FIG. 2.
Figure 6:
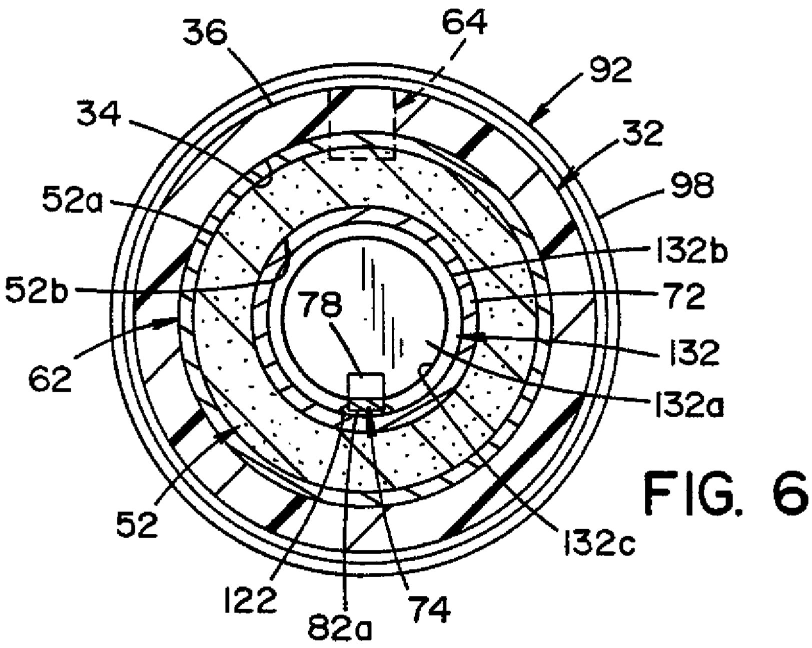
FIG. 6 is a cross-sectional view taken along lines 5-5 of FIG. 3.

Circuit protection device 10 is generally comprised of a tubular, insulated casing 32 that defines an inner bore or cavity 34. Bore or cavity 34 extends axially through casing 32. In the embodiment shown, casing 32 has a cylindrical shape and defines a cylindrical, inner cavity 34. Casing 32 has a predetermined wall thickness. In the embodiment shown, cylindrical tube casing 32 defines a cylindrical outer surface 36. The distal ends of casing 32 are formed to have two defined wall areas 38 of reduced thickness. Annular grooves or recesses 42 are cut in outer surface 36 of casing 32, as best seen in FIG. 5. These annular grooves or recesses 42 are spaced from wall areas 38 of reduced cross section.

Disposed within the casing is a voltage sensitive element (MOV) 52, having an outwardly facing, first surface 52*a*, and an inwardly facing, second surface 52*b*. In the embodiment shown, the voltage sensitive element (MOV) 52 is tubular in shape, wherein the cylindrical outer surface of the voltage sensitive element (MOV) 52 defines first surface 52*a* and the cylindrical inner surface of voltage sensitive element (MOV) 52 defines second surface 52*b*. Voltage sensitive element (MOV) 52 is dimensioned to fit within casing 32. Voltage sensitive element (MOV) 52 has an axial length slightly less than the axial length of casing 32, as shall be described in greater detail below.

In accordance with the present invention, voltage sensitive element (MOV) 52 is, as its name implies, voltage sensitive and operable to heat up when a voltage applied across the device exceeds a preselected voltage. In accordance with the present invention, voltage sensitive element (MOV) 52 is preferably comprised of a metal-oxide varistor (MOV).

By way of background, metal oxide varistors (MOVs) are primarily comprised of zinc oxide granules that are sintered together. In the embodiment shown, the zinc oxide granules are sintered together to form a cylindrical tube. Zinc oxide, as a solid, is a highly conductive material. However, minute air gaps or grain boundaries exist between the sintered zinc oxide granules in an MOV, and these air gaps and grain boundaries inhibit current flow at low voltage. At higher voltages, the gaps and boundaries between the zinc oxide granules are not wide enough to block current flow, and thus the MOV becomes a highly conductive component. This conduction, however, generates significant heat energy in the MOV. MOVs are typically classified and identified by a "nominal voltage." The nominal voltage of an MOV, typically identified by $V_{N(DC)}$, is the voltage at which the device changes from an "off state" (i.e., the state where the MOV is generally non-conductive) and enters its conductive mode of operation. Importantly, this voltage is characterized at the 1 mA point and has specified minimum and maximum voltage levels, referred to hereafter as $V_{MIN}$ and $V_{MAX}$ respectively. By way of example, and not limitation, a metal-oxide varistor (MOV) having a nominal varistor voltage, $V_{N(DC)}$, of 200 volts may actually exhibit a change from its generally non-conductive to its conductive state at a voltage between a minimum voltage, $V_{MIN}$, of 184 volts and a maximum voltage, $V_{MAX}$, of 228 volts. This range of operating voltages for an MOV of a rated nominal voltage $V_{N(DC)}$ is the result of the nature of the device. In this respect, the actual voltage value of an MOV basically depends on the thickness of the MOV and on the number and size of the zinc oxide granules disposed between the two electrode surfaces. At the present time, it is simply impossible, because of the construction and composition of metal-oxide varistors (MOVs), to produce identical devices having identical operating characteristics.

Thus, although voltage sensitive element (MOV) 52 of circuit protection device 10 preferably has a rated "nominal voltage" $V_{N(DC)}$ at 1 mA, the actual voltage at which the MOV and every other MOV changes from a non-conducting state to a conducting state may vary between a $V_{MIN}$ and a $V_{MAX}$ for the rated nominal voltage value. In the context of the present invention, the minimum voltage $V_{MIN}$ of the selected MOV is important, as will be discussed in greater detail below.

A second conductive lining 72 is provided to be in electrical contact with second surface 52*b* of voltage sensitive element (MOV) 52. In the embodiment shown, second conductive lining 72 is tubular in shape and is dimensioned to be positioned adjacent to and in contact with the inwardly facing, second surface 52*b* of voltage sensitive element (MOV) 52. Second conductive lining 72 is dimensioned such that at least a portion of lining 72 extends along the central portion of voltage sensitive element (MOV) 52. In the embodiment shown, second conductive lining 72 is cylindrical in shape and has a length at least equal to the length of voltage sensitive element (MOV) 52.

Figure 3:
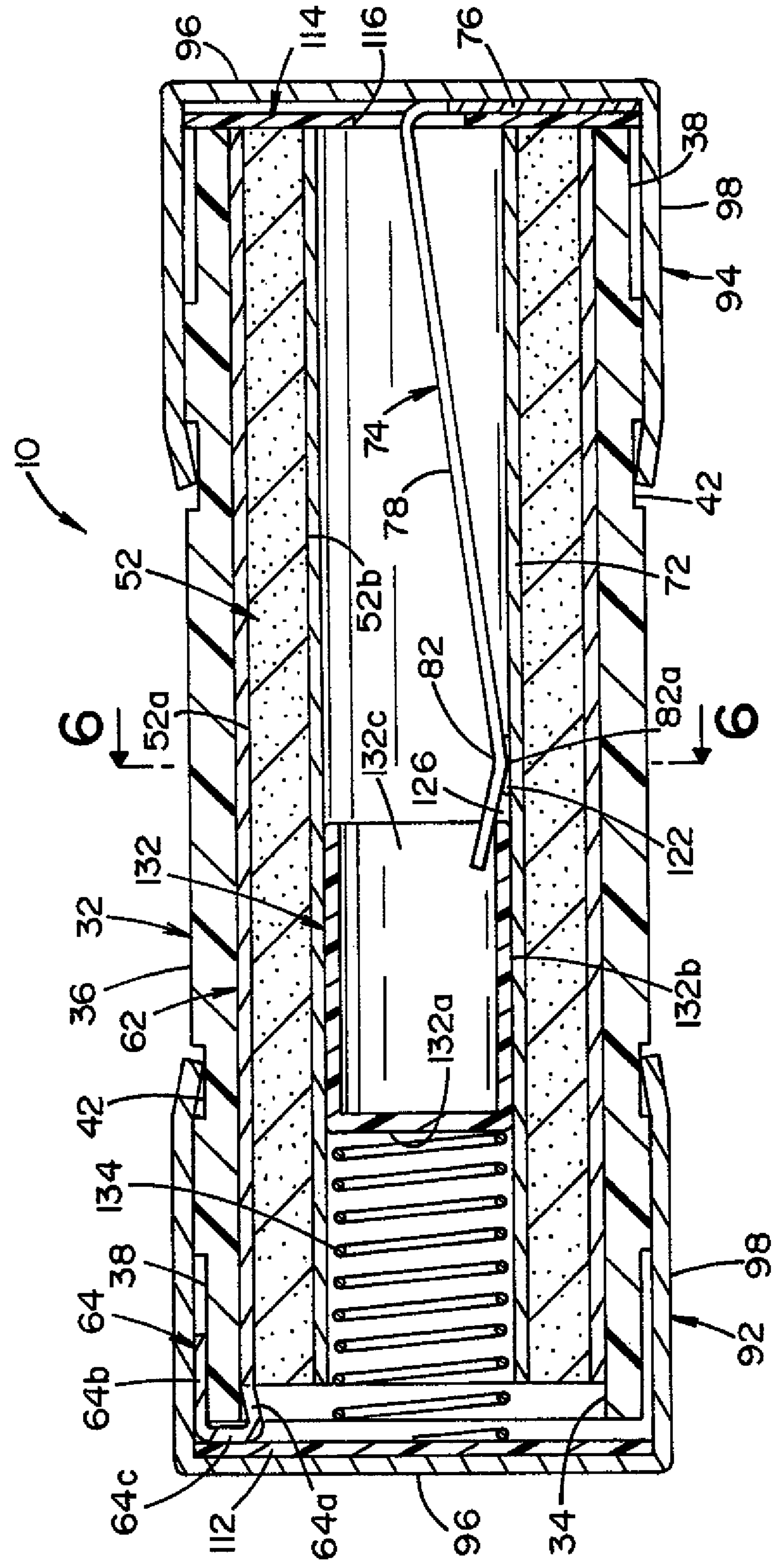
FIG. 3 is a cross-sectional view of the circuit protection device shown in FIG. 2, showing the device in a normal operating condition.
Figure 4:
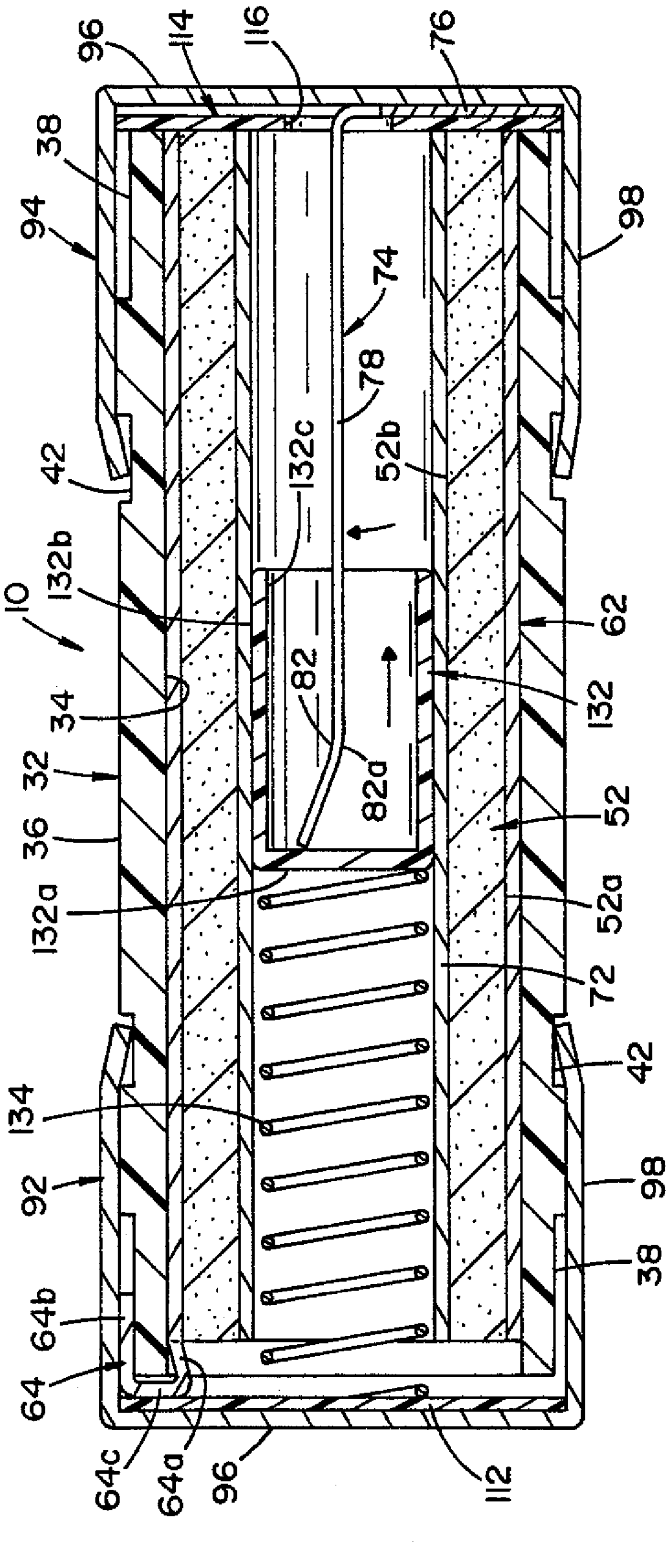
FIG. 4 is a cross-sectional view of the circuit protection device shown in FIG. 2, showing the device after actuation by a fault condition.

A first conductive liner 62 is disposed on first surface 52*a* of voltage sensitive element (MOV) 52. In the embodiment shown, first conductive liner 62 is comprised of a tubular element formed of a conductive material, such as metal. In a preferred embodiment, conductive liner 62 is formed of copper. In the embodiment shown, first conductive liner 62 has a length essentially equal to the length of voltage sensitive element (MOV) 52. First conductive liner has an inner diameter that is dimensioned to closely match the outer diameter of voltage sensitive element (MOV) 52 such that the inner surface of first conductive lining 62 is in electrical contact with first surface 52*a* of voltage sensitive element (MOV) 52 when first conductive lining 62 is positioned over voltage sensitive element (MOV) 52. A first terminal 64 is electrically connected to first conductive lining 62. In the embodiment shown, first terminal 64 is generally U-shaped. First terminal 64 is dimensioned to wrap around one end of casing 32, as best seen in FIGS. 3 and 4, with a leg portion 64*a* of U-shaped first terminal 64 electrically connected to first conductive lining 62 and another leg portion 64*b* overlaying and extending parallel to the outer surface of casing 32. As illustrated in FIGS. 3 and 4, leg portion 64*b* is disposed adjacent to wall area 38 at the end of casing 32 where the wall thickness of casing 32 is of reduced thickness. Leg portion 64*a* of U-shaped terminal 64 is bent inward slightly toward leg portion 64*b* to define a slightly flared or widened base portion 64*c* that is slightly wider than the thickness of wall area 38.

Referring now to FIG. 5, a second terminal 74 is comprised of a base portion 76 and an arm portion 78. In the embodiment shown, base portion 76 has a flat, circular plate-like configuration and arm portion 78 has an elongated, flat, rectangular strip-like configuration. In a normal configuration, arm portion 78 extends generally perpendicular from base portion 76. Base portion 76 and arm portion 78 are preferably integrally formed from a rigid, electrically conductive, flat, plate-like or sheet-like material. In a preferred embodiment, second terminal 74, i.e., base portion 76 and arm portion 78, is formed from a copper plate. The plate-like material forming base portion 76 and arm portion 78 preferably has a thickness such that arm portion 78 is rigid, but the free end of arm portion 78 can move, i.e., be deflexed, relative to base portion 76 in a manner that shall be described in greater detail below.

Base portion 76 has a diameter approximately equal to the diameter of casing 32, and arm portion 78 has a length wherein the free end thereof is located near the axial center of casing 32 when circuit protection device 10 is assembled.

As shown in the drawing, a bend 82 is formed in arm portion 78 near the free end thereof. Bend 82 defines a contact point 82*a* to form an electrical connection with inner surface of second conductive liner 72, as shall be described in greater detail below.

Voltage sensitive elements (MOV) 52 with first and second conductive liners 62, 72 are dimensioned to be disposed within casing 32 with the outer surface of first conductive lining 62 snuggly disposed against the inner surface of casing 32, as best seen in FIGS. 3 and 4. As shown in the drawings, in the embodiment shown, voltage sensitive element (MOV) 52 and first and second conductive linings 62, 72 have a length that is slightly shorter than the length of casing 32. U-shaped first terminal 64 is dimensioned to wrap around one end of casing 32, with leg portion 64*b* disposed along the outer surface of casing 32. Second terminal 74 is dimensioned to be inserted in the other end of casing 32.

End caps 92, 94 are provided on the distal ends of casing 32 for locking first and second terminals within casing 32. Each cap 92, 94 is dimensioned to enclose one end of casing 32. In this respect, each end cap 92, 94 is cup-shaped and has a circular base wall portion 96 and a cylindrical side wall portion 98. Caps 92, 94 are attached to casing 32 by crimping the opened end of side wall portions 98 onto casing 32. As best seen in FIGS. 3 and 4, the open ends of side wall portions 98 of caps 92, 94 are crimped, such that the free edge of side wall portion 98 of each cap 92, 94 is forced into an annular recess 42 formed on outer surface 36 of casing 32.

As best seen in FIG. 3, leg portion 64*b* of U-shaped first terminal 64 is captured between wall area 38 of casing 32 and side wall portion 98 of end cap 92, such that leg portion 64*b* of first terminal 64 is in electrical contact with metallic end cap 92. In this respect, end cap 92 is in electrical contact with first surface 52*a* of voltage sensitive element (MOV) 52 through first terminal 64 and first conductive lining 62. An insulating disc 112 is disposed within end cap 92. As shown in the drawing, insulating disc 112 is dimensioned to be disposed on the inner surface of bottom wall portion 96. Insulating disc 112 is formed of an electrically insulating material and is provided basically to ensure end cap 92 is electrically isolated from second conductive lining 72.

As best seen in FIG. 4, base portion 64*c* of U-shaped first terminal 64 is enlarged so as to secure the end of voltage sensitive element (MOV) 52, as well as first conductive lining 62 that is disposed along the inner surface of voltage sensitive element (MOV) 52 spaced from the end of casing 32. In other words, the ends of voltage sensitive element (MOV) 52 and first conductive lining 62 are spaced from first insulating disc 112 in the embodiment shown.

Circular base portion 76 of second terminal 74 is dimensioned to fit within cap 94, with base portion 76 disposed against, and in electrical contact with, base wall portion 96 of end cap 94.

A second, insulating disc 114, formed from an insulating material, is provided to be positioned within end cap 94. Second insulating disc 114 is a flat disc having a circular outer edge that is dimensioned to fit within end cap 94. An aperture or hole 116 is formed in the center of insulating disc 114. Aperture 116 is dimensioned to allow arm portion 78 of second terminal 74 to extend therethrough. In this respect, insulating disc 114 is designed to be positioned adjacent the ends of casing 32, voltage sensitive element (MOV) 52, and first and second conductive linings 62, 72. Second insulating disc 114, essentially, isolates the ends of first and second conductive linings 62, 72 from base wall portion 96 of end cap 94. Base portion 76 of second terminal 74 is confined between second insulating disc 114 and bottom wall portion 96 of end cap 94, as best seen in FIGS. 3 and 4.

When second terminal 74 is initially assembled with casing 32, arm portion 78 of second terminal 74 extends axially into opening 34 defined within casing 32. As best seen in FIGS. 3 and 4, the free end of arm portion 78 of second terminal 74 is slightly bent to define an offset portion. Arm portion 78 of second terminal 74 is designed to be displaced, i.e., forced, from its normal, first position (as shown in FIG. 4) to a second position wherein bend 82 formed in arm portion 78, is brought into electrical contact with the inner surface of second conductive lining 72.

According to one aspect of the present invention, elongated arm portion 78 of second terminal 74 is held in the second position (shown in FIG. 3) in electrical contact with the inner surface of second conductive lining 72 by a thermal element 122. In a preferred embodiment, thermal element 122 is a solder material that has a relatively low softening temperature or melting temperature. A low melting temperature metal alloy or a polymer having a low softening temperature may be used. Thermal element 122 is preferably a solid at room temperature (25° C.) and a solid up to a temperature around 35° C. Preferably, thermal element 122 has a melting temperature or a softening temperature of between about 70° C. and 140° C. and, more preferably, has a melting temperature or softening temperature of between 90° C. and about 100° C.

When attached to second conductive lining 72, as shown in FIG. 3, arm portion 78 of second terminal 74 is elastically deformed (as contrasted with plastically deformed) to where arm portion 78 is held in place against the inner surface of second conductive lining 72, but would spring back to approximately its original, normal position, as shown in FIG. 4, if not restrained by thermal element 122. In other words, because arm portion 78 is elongated and is formed of a generally rigid metal material, it has a spring-like characteristic. When secured in its second position, as illustrated in FIG. 3, a slot or recess 126 is formed between the contact area of arm portion 78 and the inner surface of second conductive lining 72.

A barrier element 132 is provided to be movable within casing 32. As shall be described in greater detail below, barrier element 132 is essentially an arc shield. More specifically, barrier element 132 is movable within second conductive lining 72. In the embodiment shown, barrier element 132 is generally a cup-shaped device having a flat circular base 132*a* with a cylindrical side wall 132*b*. Barrier element 132 defines a cylindrical inner cavity 132*c*. Cylindrical side wall 132*b* of barrier 132 is dimensioned such that barrier 132 is freely slidable within the opening defined by second conductive lining 72. Barrier element 132 is preferably integrally formed of an electrically insulating, non-conductive material, such as, by way of example and not limitation, a polymer material. Biasing element 134 biases barrier element 132 toward arm portion 78 of second terminal 74. When arm portion 78 is held against the inner surface of second conductive lining 72 by thermal element 122, the edge of side wall 132*b* of barrier element 132 is captured by recess or slot 126 formed by the bent end of arm portion 78 and the surface of second conductive lining 72. In the embodiment shown, biasing element 134 is a compression spring. Arm portion 78, barrier element 132, and compression spring 134 are dimensioned such that, when the free end of elongated arm 78 is held against the inner surface of second conductive lining 72, barrier element 132 is prevented from movement within second conductive lining 72 relative to arm portion 78 by bend 82 of arm portion 78. As shown in FIG. 3, compression spring 132 is compressed and exerts a biasing force against base 132*a* of cup-shaped barrier 132 which is prevented from movement by bend 82 of arm portion 78.

Referring now to the operation of circuit protection device 10, it is contemplated that one or more circuit protection devices 10 may be used together to protect an electrical circuit against a circuit fault condition. While circuit protection device 10 may be used in a conventional DIN-rail fuse mount 20, as shown in FIG. 2, circuit protection device 10 is preferably used in a fuse holder 12, as shown in FIG. 1. Fuse holder 12 allows an individual to easily connect a circuit protection device 10 to the electrical system or circuit to be protected without the individual being exposed to electrically energized power lines. In other words, a fuse holder 12 allows safe and easy attachment of a circuit protection device 10 to a "live" circuit, as well as removal therefrom.

When circuit protection device 10 is disposed within holder 12, and holder 12 is in a closed position, caps 92, 94 of circuit protection device 10 are in contact with contact blades 24 of holder 12. When holder 12 is attached across a power line and a ground and neutral line of an electrical circuit, a circuit path is created through circuit protection device 10. More specifically, a circuit path is created from end cap 92 through first conductive lining 62 and voltage sensitive element (MOV) 52 to second conductive lining 72. The circuit path continues from second conductive lining 72 through arm portion 78 of second terminal 74 (that is held in contact with second conductive lining 72 by thermal element 122) to end cap 94. In other words, when holder 12 is attached to a mounting rail (not shown) and circuit protection device 10 is in electrical contact with contact blades 24, a conductive path is defined between a power line and a ground or neutral line through circuit protection device 10. As will be appreciated, a conductive path will be established through circuit protection device 10 even if the positions of end caps 92, 94 are reversed.

As indicated above, more than one circuit protection device 10 may be used to protect an electrical circuit. A circuit protection system may comprise "N" number of circuit protection devices 10 connected in parallel to a power line and ground or neutral line. In such a "multiple device system," each circuit protection device 10 has the same rated "nominal voltage" $V_{N(DC)}$ and a peak current surge rating. The total current surge protection afforded by such a multiple device system is thus approximately "N" times the peak current surge rating of a circuit protection device 10 used in the system. For example, if each circuit protection device 10 has a peak current surge rating of 10,000 amps, the assembly has a total peak current surge rating of (10,000·N) amps. As indicated above, although each circuit protection device 10 may have the same "rated nominal voltage," in actuality, the "rated nominal voltage" of each of the MOVs within a circuit protection device 10 may vary between a $V_{MIN}$ and a $V_{MAX}$. As a result, the current surge experienced by each circuit protection device 10 may not occur at the same instant, as shall hereinafter be described.

In the event of an over-voltage condition or repetitive pulse condition, the voltage sensitive element (MOV) 52 of a circuit protection device 10 will experience an over-voltage condition. This over-voltage condition produces a voltage differential (bias) between first conductive lining 62 and second conductive lining 72 and across first surface 52*a* and second surface 52*b* of voltage sensitive element (MOV) 52. When this occurs, thermal energy is created by the surge current, and each tubular voltage sensitive element (MOV) 52 begins absorbing energy and dissipating such energy as heat. As the voltage differential across a voltage sensitive element (MOV) 52 becomes larger, electrical conductivity of the voltage sensitive element (MOV) 52 increases and increased amounts of heat are thereby generated. As indicated above, because the actual characteristics of each voltage sensitive element (MOV) 52 are not identical, one voltage sensitive element (MOV) 52 in a series arrangement will have a lower energy rating and a faster thermal response time as contrasted to the others. Thus, various voltage sensitive elements (MOV) 52 will heat up more rapidly than other voltage sensitive elements (MOV) 52 within a multiple device system. If the fault condition is severe enough, the voltage sensitive element (MOV) 52 of one or more circuit protection device 10 will heat up to the melting temperature of low temperature solder material of thermal element 122. When this occurs, arm portion 78 of second terminal 74 is no longer held in its first position (as shown in FIG. 3). When thermal element 122 melts, arm portion 78 is free to move away from inner surface 52*a* of voltage sensitive element (MOV) 52, as the metal material forming second terminal 74 seeks to return to its normal planar configuration.

According to one aspect of the present invention, second surface (the inner surface) 52*b* of voltage sensitive element (MOV) 52 heats faster than first surface (the outer surface) 52*a*. This is due to second surface 52*b* having less surface area than first surface area 52*a*, due to the different diameters of the respective surfaces. Because of its smaller surface area, the current density per unit area, and in turn, the joule heat per unit area, is higher along second surface 52*b* than along first surface 52*a*. The faster heating of second surface 52*b* provides melting of thermal element 122 when fault conditions exist.

When arm portion 78 moves away from voltage sensitive element (MOV) 52, the conductive path through circuit protection device 10 is broken, wherein circuit protection device 10 drops "off-line."

When one circuit protection device 10 drops "off-line," the current surge rating of the other circuit protection devices 10 in the multiple device system is reduced. Using the example set forth above, if one circuit protection device 10 drops "off-line," the system will lose the 10,000 ampere surge capability, but would still have a current surge rating of (10,000·(N−1)) amps, until such time as the off-line circuit protection device 10 is replaced.

The present invention thus provides a circuit protection device 10 that may be used alone or in conjunction with other similar devices to form part of a circuit protection system. Circuit protection device 10 is a self-contained unit that is operable to suppress voltage spikes in a circuit and drop off-line when the voltage spike significantly exceeds the rated nominal voltage of the device to be protected thereby preventing catastrophic failure of the same.

Figure 8:
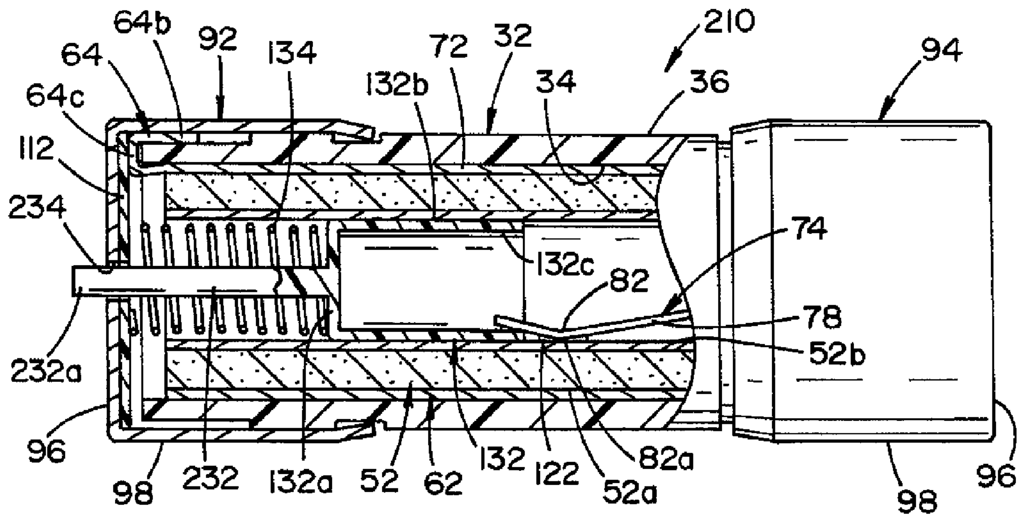
FIG. 8 is a cross-sectional view of a circuit protection device having a "tripped-circuit" indicator, illustrating another embodiment of the present invention.
Figure 9:
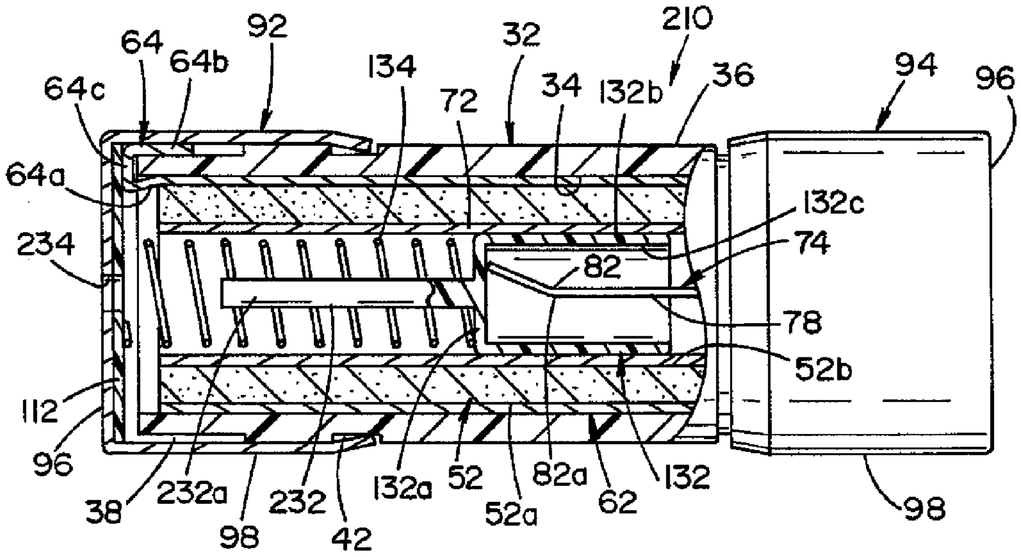
FIG. 9 is a cross-sectional view showing the circuit protection device of FIG. 8 showing the device in a "tripped-circuit" condition.

Referring now to FIGS. 8 and 9, a circuit protection device 210 illustrating an ultimate embodiment of the present invention is shown. Circuit protection device 210 in many respects is the same as circuit protection device 10. In this respect, components of circuit protection device 210 that are like the components in circuit protection device 10 are indicated with the same reference numbers. The main difference between circuit protection device 210 and the aforementioned circuit protection device 10 is that cylindrical barrier element 132 includes an elongated pin 232 extending axially from flat, circular base 132*a* of barrier element 132. Pin 232 is dimensioned to extend through an opening 234 formed through first insulating disk 112 and base wall portion 96 of end cap 92 when barrier element 132 is maintained in the first position against biasing element 134 by arm portion 78 of second terminal 74, as best seen FIG. 8. As shown in FIG. 8, end portion 232*a* of pin 232 extends beyond base wall portion 96 of end cap 92 when circuit protection device 210 is in its normal operating configuration. In the event of a fault condition that would cause circuit protection device 210 to "trip," end portion 232*a* of pin 232 would be withdrawn into the inner bore 34 of casing 32 as biasing element 134 forces barrier element 132 to a "tripped position." Thus, the absence of the end portion 232*a* of pin 232 extending from end cap 92 is an indication that circuit protection device 210 has "tripped" and should be replaced. Circuit protection device 210 thus provides a quick and simple configuration to provide an indicator means indicating the condition of circuit protection device 210.

Figure 7:
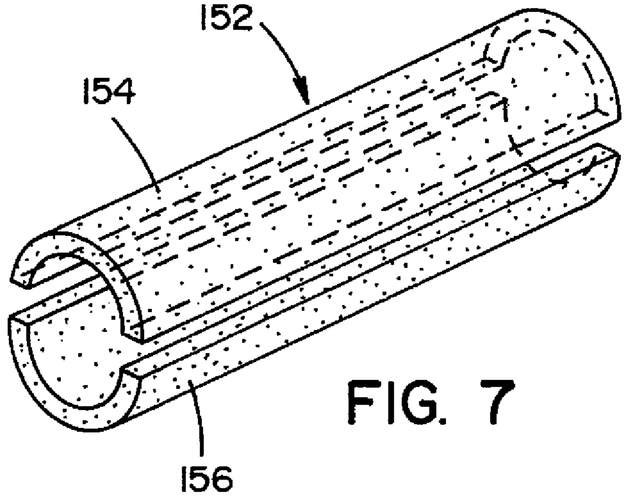
FIG. 7 is a perspective view of a two-piece metal oxide varistor element, according to another embodiment of the present invention.

The foregoing description is a specific embodiment of the present invention. It should be appreciated that this embodiment is described for purposes of illustration only, and that numerous alterations and modifications may be practiced by those skilled in the art without departing from the spirit and scope of the invention. For example, in the embodiment described heretofore, voltage sensitive element (MOV) 52 is a one-piece component. FIG. 7 shows a voltage sensitive element 152 formed of two sections 154, 156 that may be used in place of voltage sensitive element (MOV) 52 in circuit protection device 10. As will be appreciated by those skilled in the art, first and second conductive linings 62, 72 would maintain sections 154, 156 in the desired tubular configuration within circuit protection device 10. It is intended that all such modifications and alterations be included insofar as they come within the scope of the invention as claimed or the equivalents thereof.

Having described the invention, the following is claimed:

1. A disposable voltage suppression device for suppressing voltage surges in an electrical circuit, said device comprised of:

- a tubular casing formed of an electrically insulating material;
- a first conductive component attached to a first end of said casing;
- a second conductive component attached to a second end of said casing;
- a voltage sensitive element within said tubular casing, said voltage sensitive element having a first surface and a second surface and a predetermined voltage rating across said first and second surfaces, said voltage sensitive element increasing in temperature as voltage applied across said first and second surfaces exceeds said voltage rating;
- a first terminal electrically connected to said first surface of said voltage sensitive element and to said first conductive component;
- a thermal element electrically connected to said second surface of said voltage sensitive element, said thermal element being an electrically conductive solid at room temperature and having a predetermined softening temperature;
- a second terminal electrically connected to said second conductive component, said second terminal having a contact portion in electrical connection with said second surface of said voltage sensitive element, said voltage sensitive element sensing the voltage drop between said first conductive element and said second conductive element, said second terminal being maintained in electrical contact with said voltage sensitive element by said thermal element and being biased away therefrom, wherein said second terminal moves away from electrical contact with said voltage sensitive element and breaks said electrical current path if an over-voltage condition sensed by said voltage sensitive element exceeds the voltage rating of said voltage sensitive element and causes said voltage sensitive element to heat said thermal element beyond its softening point; and
- an arc shield movable from a first position wherein said arc shield allows contact between said contact portion of said second terminal and said voltage sensitive element to a second position wherein said shield is disposed between said contact portion of said second terminal and said voltage sensitive element when said second terminal moves from electrical contact with said voltage sensitive element.

2. A voltage suppression device as defined in claim 1, wherein said voltage sensitive element is a metal oxide varistor (MOV).

3. A voltage suppression device as defined in claim 2, wherein said metal oxide varistor (MOV) is tubular in shape.

4. A voltage suppression device as defined in claim 1, wherein said thermal element is a metal solder comprised of a fusible alloy.

5. A voltage suppression device as defined in claim 4, wherein said metal solder has a melting point of about 95° C.

6. A voltage suppression device as defined in claim 1, wherein said thermal element is an electrically conductive polymer.

7. A voltage suppression device as defined in claim 1, wherein said arc shield is supported in said first position by said second terminal.

8. A voltage suppression device as defined in claim 1, wherein said arc shield is biased toward said second position and movable along the axis of said casing.

9. A voltage suppression device as defined in claim 8, wherein said arc shield is biased by a spring element.

10. A voltage suppression device as defined in claim 9, wherein said arc shield is maintained in said first position by said second terminal when said second terminal is in contact with said thermal element.

11. A voltage suppression device as defined in claim 8, wherein said arc shield is movable within said voltage sensitive element.

12. A disposable voltage suppression device as in claim 1, wherein said second terminal has a contact portion and a second portion that extends away from the contact portion, at least the second portion of said second terminal being flexible and being located over at least a portion of the arc shield and being bent toward the thermal element, said contact portion of said second terminal being held in electrical contact with the voltage sensitive element by the thermal element before the thermal element softens, said second terminal flexing outward away from the thermal element when the thermal element softens, and the arc shield being biased toward the thermal element before the thermal element softens, but being constrained from movement toward the thermal element by the second portion of said second terminal at a location along the second portion that is spaced away from the contact portion, until the thermal element softens and said second terminal flexes outward away from the thermal element.

13. A disposable voltage suppression device as in claim 12, wherein said second terminal is released from said bent condition and it flexes outward to a more straightened condition, when the thermal element softens.

14. A disposable voltage suppression device as in claim 12, wherein the second terminal flexes outward to a position spaced from the thermal element when the thermal element softens, and at least a portion of the arc shield passes between the thermal element and said second terminal when the voltage across the voltage sensitive element exceeds the voltage rating of the voltage sensitive element and heats up the voltage sensitive element so as to soften the thermal element.

15. A disposable voltage suppression device as in claim 1, wherein in the normal operation of the voltage sensitive element the thermal element is solid, but when the voltage across the voltage sensitive element increases beyond the voltage rating of the voltage sensitive element, the voltage sensitive element heats to a temperature at or above said predetermined softening temperature, the increased heat causing the thermal element to soften, said second terminal having a contact portion and a second portion that extends away from the contact portion, the contact portion of said second terminal is held in electrical contact with the voltage sensitive element solely by the thermal element and the second portion of said second terminal is positioned to block the path of the arc shield prior to the time that the thermal element softens, and the contact portion of the second terminal is released from the thermal element when the thermal element softens, and the second terminal moves away from the thermal element, when the thermal element softens, and releases the are shield to pass along a path in close proximity to the thermal element.

16. A disposable voltage suppression device as in claim 1, wherein said second terminal has a contact portion and a second portion, said contact portion being held in electrical contact with the voltage sensitive element by the thermal element, and being biased away from the voltage sensitive element by internal mechanical forces in said second terminal, said arc shield is located between the voltage sensitive element and the second portion of said second terminal while the contact portion of said second terminal is held by the thermal element, the second portion of said second terminal extending through the path of the arc shield to constrain the movement of the arc shield prior to the softening of the thermal element, and said arc shield traversing a path substantially parallel to the voltage sensitive element once the thermal element softens and releases the contact portion of said second terminal.

17. A voltage suppression device for suppressing voltage surges in an electrical circuit, said device comprised of:

a tubular casing formed of an electrically insulating material;

a first conductive component attached to a first end of said casing;

a second conductive component attached to a second end of said casing;

a voltage sensitive element having a predetermined voltage rating, said voltage sensitive element increasing in temperature as voltage applied across said voltage sensitive element exceeds said voltage rating;

terminals for electrically connecting said voltage sensitive element between said first conductive component and said second conductive component;

a normally closed, thermal switch comprised of one end of one of said terminals, a surface of said voltage sensitive element and a thermal element, said one end of one of said terminals being maintained in electrical contact with said surface of said voltage sensitive element by said thermal element, said thermal switch being electrically connected in series with said voltage sensitive element between one of said conductive components and said voltage sensitive element, said thermal switch being thermally coupled to said voltage sensitive element wherein said one of said terminals moves from a normally closed position wherein said one of said terminals is maintained in electrical contact with said surface of said voltage sensitive element to an open position wherein said one of said terminals moves out of electrical contact with said surface of said voltage sensitive element to form a gap between said one of said terminals and said voltage sensitive element when the temperature of said voltage sensitive element reaches a level causing said thermal element to soften;

said one of said terminals including a contact portion and a second portion that extends away from the contact portion;

a non-conductive barrier operable to move into said gap when said one of said terminals moves to an open position, said barrier preventing line voltage surges from arcing between said one of said terminals and said voltage sensitive element, the second portion of said one of said terminals extending over at least a portion of the non-conductive barrier and bending toward the thermal element so that the contact portion is held by the thermal element until said thermal element begins to soften, and said non-conductive barrier being biased toward the thermal element, but being constrained from movement toward the thermal element by contact with the second portion of said one of said terminals at a location that is spaced away from the contact portion, until said thermal element begins to soften.

18. A voltage suppression device as defined in claim 17, wherein said thermal switch is comprised of a terminal held in electrical contact with said voltage sensitive element by said thermal element, said terminal being biased away from said voltage sensitive element.

19. A voltage suppression device as defined in claim 18, wherein said thermal element is a low melting temperature solder material.

20. A voltage suppression device as in claim 17, wherein at least the second portion of said one of said terminals is flexible and is located over at least a portion of the non-conductive barrier and is bent toward the thermal element, said contact portion of said one of said terminals is held in electrical contact with the voltage sensitive element by the thermal element before the thermal element softens, said second portion of said one of said terminals flexes outwardly away from the thermal element when the thermal element softens, and the non-conductive barrier is biased toward the thermal element before the thermal element softens, but is constrained from movement toward the thermal element by the second portion of said one of said terminals at a location along the second portion that is spaced away from the contact portion, until said one of said terminals flexes outwardly away from the thermal element.

21. A voltage suppression device as in claim 17, wherein said one of said terminals is flexible and, when released from said thermal element, it flexes outwardly away from said thermal element to a more straightened condition.

22. A voltage suppression device as in claim 17, wherein said non-conductive barrier is positioned with its forward edge in close proximity to the second portion of said one of said terminals, said second portion of said one of said terminals is positioned to block the path of the non-conductive barrier prior to the softening of the thermal element.

23. A voltage suppression device as in claim 17, wherein said thermal element is formed of an electrically conductive solder, said second portion of said one of said terminals being biased away from the thermal element by its internal mechanical forces, but its contact portion is held in electrical contact with the voltage sensitive element by the thermal element, said second portion of said one of said terminals extends over at least a portion of the non-conductive barrier and the second portion bends toward the thermal element while the contact portion is held by the thermal element, the non-conductive barrier is biased toward the thermal element, but is constrained from movement toward the thermal element by a region along the length of said second portion of said one of said terminals, spaced away from the contact portion, while the contact portion of said one of said terminals is held by the thermal element.

24. A voltage suppression device as in claim 17, including an indicator for indicating movement of said barrier.

25. A voltage suppression device for suppressing voltage surges in an electrical circuit, said device comprised of:

a tubular casing formed of an electrically insulating material;

a first conductive component attached to a first end of said casing;

a second conductive component attached to a second end of said casing;

a voltage sensitive element disposed within said casing, said voltage sensitive element having a first surface and a second surface and a predetermined voltage rating across said first and second surfaces, said voltage sensitive element increasing in temperature as voltage applied across said first and second surfaces exceeds said voltage rating;

a first terminal electrically connected to said first surface of said voltage sensitive element and said first conductive component;

a thermal element electrically connected to said second surface of said voltage sensitive element, said thermal element being an electrically conductive solid at room temperature and having a predetermined softening temperature;

a second terminal formed of a spring metal having one end in electrical connection with said second surface of said voltage sensitive element and another end connected to said second conductive component, said voltage sensitive element sensing a voltage drop between said first conductive component and said second conductive component, said second terminal being bent from a normal and relaxed configuration to be maintained in contact with said voltage sensitive element by said thermal element, said second terminal being inherently biased away from said voltage sensitive element toward said normal and relaxed configuration, wherein said second terminal springs away from electrical contact with said voltage sensitive element softens and breaks said electrical current path if an over-voltage condition sensed by said voltage sensitive element exceeds the voltage rating of said voltage sensitive element and causes said voltage sensitive element to heat said thermal element beyond its softening point; and an arc shield movable from a first position wherein said arc shield allows contact between said second terminal and said voltage sensitive element to a second position wherein said arc shield is disposed between said second terminal and said voltage sensitive element when said second terminal moves from electrical contact with said voltage sensitive element;

the second terminal having a contact portion for making electrical contact with the thermal element and a second portion, the second portion extending through the path of the arc shield and blocking the movement of the arc shield until the thermal element reaches its softening point.

* * * * *